(No Model.)

M. B. STAMBAUGH.
ELEVATOR ATTACHMENT FOR HARVESTERS.

No. 409,377. Patented Aug. 20, 1889.

Witnesses
M. Fowler
R. W. Bishop.

Inventor
Martin B. Stambaugh

By his Attorneys

UNITED STATES PATENT OFFICE.

MARTIN B. STAMBAUGH, OF CARTHAGE, DAKOTA TERRITORY.

ELEVATOR ATTACHMENT FOR HARVESTERS.

SPECIFICATION forming part of Letters Patent No. 409,377, dated August 20, 1889.

Application filed April 2, 1889. Serial No. 305,714. (No model.)

*To all whom it may concern:*

Be it known that I, MARTIN B. STAMBAUGH, a citizen of the United States, residing at Carthage, in the county of Miner and Territory of Dakota, have invented a new and useful Elevator Attachment for Harvesters, of which the following is a specification.

My invention relates to improvements in elevator attachments for harvesters; and it consists in certain novel features hereinafter described and claimed.

Figure 1:
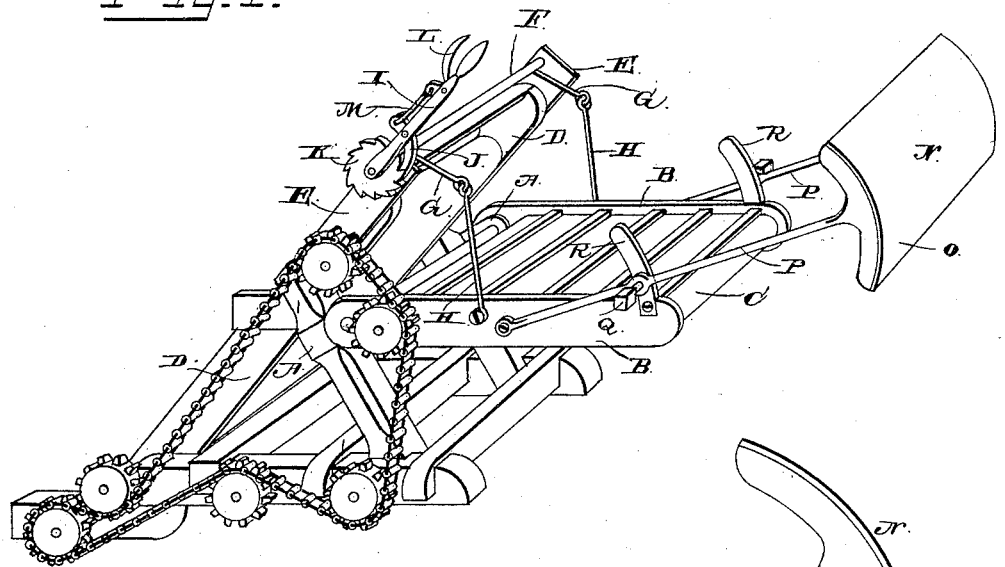
Figure 2:
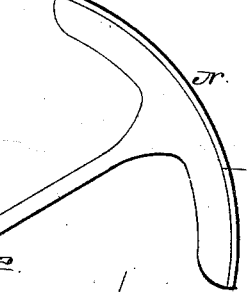

In the drawings, Figure 1 is a perspective view of the device from the rear. Fig. 2 is a side elevation showing the manner of adjusting the shield.

In the drawings I have shown only the inclined elevator and the supporting-frame therefor of a harvester or header, as that portion is all that is necessary to enable others skilled in the art to understand my improvement.

At a proper point on the supporting-frame I secure the brackets A, and to the said brackets I pivot the ends of the side bars B, which support the carrier C. At the upper ends of the side bars D of the elevator I secure the brackets E, and in the said brackets I journal a rock-shaft F, having the crank-arms G formed integral therewith near its ends, and from the said crank-arms links H depend, the lower ends of said links being pivoted to the side bars B, as shown. The rock-shaft F is operated by a lever I, secured to one of its ends, and is held in its adjusted position by means of a pawl J, pivoted on the said lever and engaging a serrated disk K, secured to one of the brackets E. This pawl J is disengaged from the serrated disk K by an angle-lever L, pivoted to the lever I near the upper end of the same and connected by a link M with the free end of the said pawl.

A shield N is arranged beyond and adjacent to the free end of the carrier C, and consists of a curved plate O and the supporting-arms P, having their inner ends pivoted to the side bars B, and the plate O secured to their outer ends. The shield can thus be adjusted so as to be more or less above the carrier C, as may be desired, and in order that it may be secured in its adjusted position I provide the arms P with set-screws Q, which are adapted to bind against the curved bars R, erected on the side bars B, near the free ends of the same, as shown.

In practice the header is driven over the field and the grain cut thereby will be carried upward by the elevator in the usual manner and dumped onto the carrier C, and by the said carrier will be conveyed to a wagon drawn along the field in proper position to receive the grain from the end of the said carrier. As the grain in the wagon increases in height the carrier is set at a greater inclination by properly rotating the rock-shaft, as will be readily understood, and the shield is adjusted to prevent the grain being blown about by the wind.

My device is very simple, and its advantages are thought to be obvious.

Having thus described my invention, what I claim, and desire to secure by Letters Patent, is—

1. The combination of the elevator-frame, the brackets A, secured to the same at an intermediate point of the height of the same, the carrier pivoted to said brackets A, the brackets E at the upper end of the elevator-frame, the rock-shaft journaled in said brackets and provided with crank-arms near its ends, the links connecting said crank-arms with the carrier, and means for rotating the rock-shaft, as set forth.

2. The combination, with the carrier, of the arms P, pivoted to the sides of the same and projecting beyond the end thereof, and the curved plate O, secured to the ends of said arms, as set forth.

3. The combination, with the carrier C and the curved bars rising from the side bars of said carrier, of the shield consisting of supporting-arms pivoted to the side bars of the carrier and a curved plate secured to the free ends of said arms, and the set-screws mounted in said supporting-arms and bearing against the curved bars, as set forth.

In testimony that I claim the foregoing as my own I have hereto affixed my signature in presence of two witnesses.

MARTIN B. STAMBAUGH.

Witnesses:
W. L. PALMER,
FRED. H. ANGLE.